A. P. ANDERSON.
GARDEN TOOL.
APPLICATION FILED DEC. 30, 1919.

1,364,825.

Patented Jan. 4, 1921.

WITNESS:
Alfred T. Bratton

Andrew P. Anderson
INVENTOR.
BY
Victor J. Evans
ATTORNEY.

UNITED STATES PATENT OFFICE.

ANDREW P. ANDERSON, OF NARBERTH, PENNSYLVANIA.

GARDEN-TOOL.

1,364,825.  Specification of Letters Patent.  Patented Jan. 4, 1921.

Application filed December 30, 1919. Serial No. 348,263.

*To all whom it may concern:*

Be it known that I, ANDREW P. ANDERSON, a citizen of the United States, residing at Narberth, in the county of Montgomery and State of Pennsylvania, have invented new and useful Improvements in Garden-Tools, of which the following is a specification.

An object of the invention is to provide a trimming and cutting tool for use in the garden for trimming edges or borders thereof.

The invention comprehends among other features the provision of a simple device which is particularly adapted for use in trimming the edges of a garden or plot of ground as around a tree or shrubbery or in trimming the edges of grass or the ground around a garden to the end that a neat and effective appearance thereof can be had. To this end the invention is particularly adapted for cutting and trimming the edges or borders of circular gardens or plots of ground or grass around trees, shrubbery and the like so that a perfect circular border can be obtained to greatly enhance the appearance of the garden.

Figure 1:
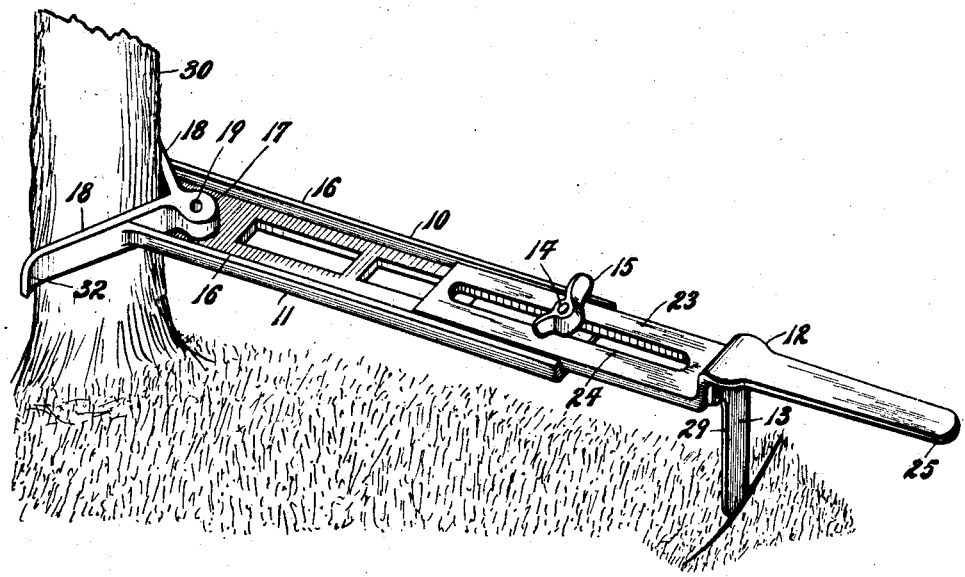

In the further disclosure of the invention, reference is to be had to the accompanying drawings constituting a part of this specification, in which similar characters of reference denote corresponding parts in all the views, and in which, Figure 1—is a perspective view of the tool.

Figure 2:
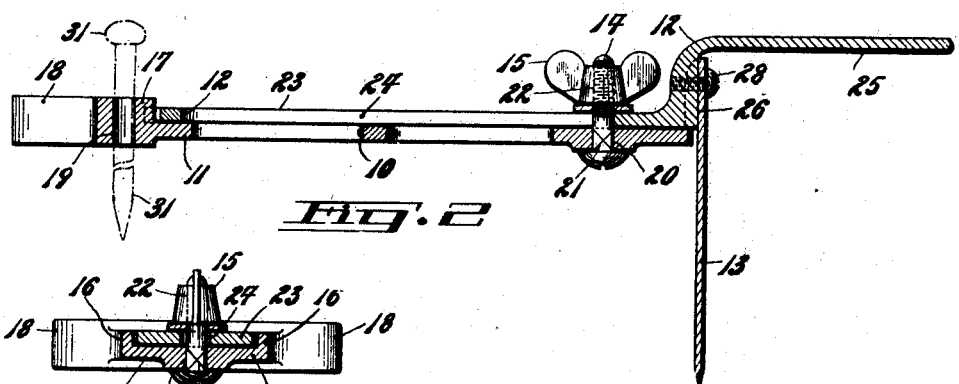

Fig. 2—is an enlarged vertical sectional view taken through the tool.

Figure 3:
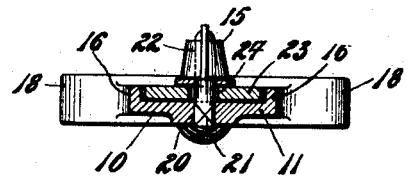

Fig. 3— is a vertical transverse sectional view, and

Figure 4:
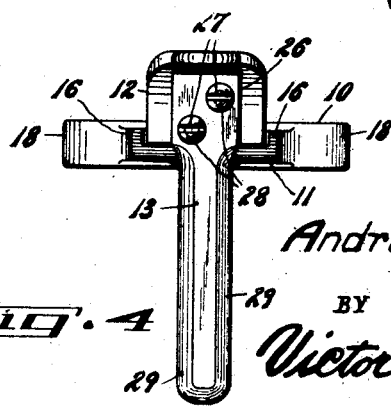

Fig. 4— is a rear elevation showing the cutting blade or trimming blade.

Referring more particularly to the views, the numeral 10 indicates the tool or implement in its entirety and which consists substantially of a body 11, a handled slide 12, a cutting and trimming blade 13 and a screw 14 and thumb nut 15 for the latter. The body 11 is formed with an elongated portion, of a channel shape in cross section provided with guides 16 and the outer extremity of the body is formed with a head 17 consisting substantially of relatively flared arms or pieces 18 with an aperture 19 formed in the head at the inner extremity thereof. The body furthermore at the inner end has a squared opening 20 through which passes the squared shank 21 of the screw 14, the latter having a threaded stem 22. The slide 12 has its elongated portion or piece 23 provided with a longitudinal slot 24 and adapted to be slid backwardly and forwardly in the guide 16, said guide including an offset handle 25 which extends parallel to the body of the slide and is offset therefrom to provide a seat 26 for the blade 13, the latter having a plurality of openings 27 through which pass suitable screws 28 to secure the blade against the seat 26 so that the blade will depend vertically as shown, the blade preferably being provided with a plurality of opposed cutting edges 29.

It will be apparent that the thumb nut 15 threaded on to the threaded stem 22, normally points and secures the slide rigid relative to the body 11 and that unloosening the thumb nut, the slide and body can be relatively slid to arrange the slide in an extended relation relative to the body or bring the slide into the innermost position relative to the guides, this operation causing the blade to be moved farther away from or closer to the head and thus increasing or decreasing the radius to accommodate the implement to the cutting of the edge of the ground or grass around a tree or the like. In Fig. 1, a trunk of a tree or sapling is indicated by the numeral 30 and it will be apparent that by holding the head 17 against the tree and adjusting the slide relative to the body, the device when actuated by grasping the handle and swinging or moving the device around the tree will cause the blade to cut and trim the edges of the border of the plot of ground around the tree. In Fig. 2, I disclose a stick 31 which is passed through the opening or aperture 19 the stick in this instance having been inserted in the center of a small garden, the edge or border of which is to be cut or trimmed. Of course it will be understood that instead of having the stick or upright passed through the aperture 19, the head 17 can be applied directly against the periphery of the stick or upright but in cases where the stick is of a small diameter it has been found to be more advantageous to the proper operation of the device to apply the device to the stick as shown in Fig. 2. Where the stick or tree as the case may be, is of larger diameter, it is more preferable to simply hold the head 17 against the periphery of the latter and for this reason the flared arms or pieces 18 of the head at their extremities are curved as at 32.

It will of course be understood that the body and slide can be made of any desired length and that by the relative sliding movement of the one upon the other, gardens of various radii can be quickly and effectively trimmed and cut as to the borders or edges thereof.

Having described my invention, I claim—

1. A garden implement comprising a body formed to provide guides and having at one end a squared opening, a flared head on the other end of the body, a longitudinally slotted slide mounted to slide in said guides, an offset handle on said slide, a depending blade secured adjacent to the point of offsetting of said handle relative to the slide, a squared bolt passed through said squared opening and through the slot in the slide and a thumb nut threaded on the bolt and adapted to secure the slide and body against relative movement.

2. A garden implement comprising a body providing longitudinal guides, a head at one end of the body, a longitudinally slotted guide mounted to slide in the guides, an offset handle extended from one end of the slide, a cutting blade carried by the slide adjacent the handle thereof and means passing through the slot in the slide and engaging with the body for securing the body and slide against relative movement.

In testimony whereof I affix my signature.

ANDREW P. ANDERSON.